(12) United States Patent
Axelson

(10) Patent No.: US 9,232,764 B2
(45) Date of Patent: Jan. 12, 2016

(54) MILKING SYSTEM AND METHOD FOR ANALYZING MILK

(75) Inventor: Johan Axelson, Bromma (SE)

(73) Assignee: DELAVAL HOLDING AB, Tumba (SE)

( * ) Notice: Subject to any disclaimer, the term of this patent is extended or adjusted under 35 U.S.C. 154(b) by 380 days.

(21) Appl. No.: 13/640,047

(22) PCT Filed: Apr. 1, 2011

(86) PCT No.: PCT/EP2011/055094
§ 371 (c)(1),
(2), (4) Date: Oct. 9, 2012

(87) PCT Pub. No.: WO2011/124531
PCT Pub. Date: Oct. 13, 2011

(65) Prior Publication Data
US 2013/0025540 A1 Jan. 31, 2013

Related U.S. Application Data

(60) Provisional application No. 61/322,588, filed on Apr. 9, 2010.

(30) Foreign Application Priority Data

Apr. 9, 2010 (SE) .................................... 1050349-8

(51) Int. Cl.
A01J 5/007 (2006.01)
A01J 5/013 (2006.01)

(52) U.S. Cl.
CPC ................. *A01J 5/0132* (2013.01); *A01J 5/007* (2013.01)

(58) Field of Classification Search
CPC .............................. A01J 5/007; A01J 5/0132
USPC .......... 119/14.02, 14.03, 14.08, 14.18, 14.01, 119/14.14
See application file for complete search history.

(56) References Cited

U.S. PATENT DOCUMENTS 3,841,756 A 10/1974 Grochowicz
5,388,549 A 2/1995 Holroyd
(Continued)

FOREIGN PATENT DOCUMENTS

RU 2 054 247 C1 2/1996
RU 2 340 171 C2 12/2008
(Continued)

OTHER PUBLICATIONS

Machine translation for WO2006/105990.*
(Continued)

*Primary Examiner* — Son T Nguyen
(74) *Attorney, Agent, or Firm* — Young & Thompson

(57) ABSTRACT

A milking system includes a milk storage tank, a common milk line connected to the tank, at least two milking stations connected to the milk line, a milk constituent analyzing unit connected to the milk line and analyzing the milk provided from each of the stations through the milk line, with respect to a specific milk constituent, and a computer operatively connected to the analyzing unit. The computer stores milk quality information of the extracted milk and animal identity data of each of the specifically identified animals. Each station automatically identifies a specific animal, extracts milk from the animal, and transfers the milk through the common milk line to the milk storage tank. The stations, the computer, and the analyzing unit are operatively connected to allow a result of the milk analysis to be associated with the animal(s) identity specifically identified at each station from which the milk was extracted.

20 Claims, 2 Drawing Sheets

(56) References Cited

U.S. PATENT DOCUMENTS

| | | | |
|---|---|---|---|
| 7,302,349 B2* | 11/2007 | Friggens et al. | 702/32 |
| 8,714,107 B2* | 5/2014 | Bosma | 119/14.02 |
| 2002/0108576 A1* | 8/2002 | Lely et al. | 119/14.02 |
| 2002/0124803 A1* | 9/2002 | Chen et al. | 119/14.08 |
| 2004/0168646 A1* | 9/2004 | Maier, Jr. | 119/14.18 |
| 2004/0194712 A1 | 10/2004 | Johannesson et al. | |
| 2005/0223996 A1 | 10/2005 | Bosma et al. | |
| 2006/0191485 A1 | 8/2006 | Francke et al. | |
| 2008/0035063 A1 | 2/2008 | Birk et al. | |
| 2008/0236500 A1* | 10/2008 | Hodges et al. | 119/14.02 |
| 2009/0272325 A1 | 11/2009 | Sogaard et al. | |
| 2010/0058989 A1* | 3/2010 | Ohman et al. | 119/14.08 |
| 2010/0154714 A1* | 6/2010 | DeVilliers et al. | 119/14.08 |
| 2010/0180824 A1* | 7/2010 | Bright et al. | 119/14.08 |

FOREIGN PATENT DOCUMENTS

| | | |
|---|---|---|
| SU | 1099907 A | 6/1984 |
| WO | 03/090522 A1 | 11/2003 |
| WO | 20051067702 A1 | 7/2005 |
| WO | 20061105990 A2 | 10/2006 |
| WO | 20081140407 A1 | 11/2008 |

OTHER PUBLICATIONS

International Search Report, dated Aug. 5, 2011, from corresponding PCT application.

International-Type Search Report, dated Sep. 30, 2011, from corresponding PCT application.

Supplementary International Search Report, dated Jul. 12, 2012, from corresponding PCT application.

* cited by examiner

MILKING SYSTEM AND METHOD FOR ANALYZING MILK

TECHNICAL FIELD

The invention relates to a milking system for milking animals, in which milk is analyzed. The invention relates also to a method for analyzing milk.

BACKGROUND AND PRIOR ART

In the field of dairy farming, systems for regularly measuring the health of the animals and the milk quality have been developed. The results of the measurements may affect how the animals should be milked, i.e. how milking parameters such as vacuum levels and milking frequency are set, how the animals should be fed, and how the animals should otherwise be treated on an individual basis. Hereby, the animals are kept healthy and an efficient milk production is provided.

Examples of such systems include milking installations comprising automatic milking robots that identify an animal, extract milk from the animal, and transfer the milk to a milk storage tank. There also exist robots that can sample part of the milk for testing, e.g. transferring the sample part to an automatic somatic cell counter that provides the cell count. Each robot in such systems is provided with its own cell counter, which is connected to a data bus of the robot. In such a manner, the robot receives a quality indication of the milk of the animal. An example of such a milking robot is the VMS (voluntary milking system) having an OCC (online cell counter) as provided by DeLaval.

In systems having a plurality of milking robots, which all are provided with their own analysis equipment, the robots transfer the test results, in this case the cell counts, together with the animal identities to a monitoring computer so that information for a specific animal is collected in a single database, regardless of which one of the robots that was used to milk the animal. The collecting activities can be controlled by one of the robots operating as a master unit, where the others operate as slave units. Alternatively, an overall controller, such as a computer, is provided for receiving animal and milking information, such as identities, milk yields, cell counts and other milk quality or animal health indications, from the robots. Such a system having a plurality of voluntary milking systems, where each has a cell counter, is easy to use and can provide cell count data immediately. However, the cell counter makes each milking robot more expensive. Moreover, a lack of balance of the use of different milking robots leads to a lack of use of some of the sampling and analyzing devices. This may have a negative influence on the operation and reliability of such equipment.

SUMMARY OF THE INVENTION

An object of the invention is to provide a milking system and a method for analyzing milk, which overcome the disadvantages of the prior art and still provide measurements in a satisfying manner.

A further object of the invention is to provide a milking system and a method for analyzing milk, wherein milking information is extensively used so that, for example, the number of analyzing units, such as cell counters, can be lowered, but not necessarily the number of analyses.

A yet further object of the invention is to provide a milking system and a method for analyzing milk, which can benefit from the knowledge that it is not always necessary to test milk from every animal at every milking occasion. For example, data from previously performed tests can be used so that animals previously considered healthy are generally not tested as frequently as animals previously considered unhealthy. Also, historical data indicating many new cases of infected animals in a herd can be used to increase the measuring frequency for a specific animal in the herd, even if the milk from this animal has been tested recently. Moreover, measured hormone levels can, for example, be used for scheduling cell counts for an animal, since cows for example are variously susceptible to mastitis depending on the lactation cycle period, and the lactation cycle can be determined from hormone level measurements.

The above objects are attained by milking systems and methods as claimed in the appended claims.

According to one aspect of the invention a milking system for milking animals is provided. The milking system comprises a common milk line connected to a milk storage tank, a plurality of milking stations connected to the common milk line, and a computer for storing milk quality information and animal identity data. Each milking station is adapted to automatically identify an animal, to automatically extract milk from the animal, and to automatically transfer the milk in the common milk line from the milking station to the milk storage tank. A milk constituent analyzing unit is arranged to analyze milk from the common milk line with respect to a specific constituent, such as a hormone, protein, fat, or somatic cells. The milking stations, the computer, and the milk constituent analyzing unit are communicatively connected, thereby allowing the result of the analysis of the milk with respect to the specific constituent to be associated with the identity of the animal or the identities of the animals, from which the milk was extracted. Such information is advantageously provided to an operator of the milking systems in various manners. Different kinds of alarms may be triggered. The analyzing and associating are typically performed continuously, or at least repeatedly, to test milk from different animals or different groups of animals.

By arranging the milk constituent analyzing unit to analyze milk from the common milk line, where milk from a plurality of milking stations is transferred, it is no longer necessary to have one milk constituent analyzing unit, such as a cell counter, for every milking station.

The invention may further allow for an estimation of the content of the specific constituent of the milk in the milk storage tank.

In one embodiment of the invention the milking system has a control arrangement for controlling the transfer of milk in the common milk line.

The control is preferably implemented in the computer for storing milk quality information and animal identity data or in any other kind of control device.

The control can be used to avoid analyzing milk from more than one animal. For example, if a plurality of milking stations have milk for transfer to the milk storage tank at the same time; this is typically allowed only if none of the milk should be tested. However, if milk from one animal should be tested, the milk from the milking station in question is transferred, but the transfer from the other milking stations have to wait so that milk from this animal is not mixed with milk from other animals before being analyzed. Preferably, only one milking station at a time is allowed to transfer milk in the common milk line.

In another embodiment of the invention the milking stations are controlled to transfer milk in the common milk line sequentially on a scheduled basis. Such control can be realized by assigning time periods for milk transfer to the milking stations so that they transfer milk in a specific time period.

In yet another embodiment of the invention each of the milking stations is controlled to transfer milk in the common milk line in response to a request from that milking station. Such on-request control also organizes the milk transfer while being flexible to the current needs of the respective milking stations. If there are requests for transfer of milk that should be tested, the transferring can be organized so that the transfer requests are allowed one at a time. If there are only requests for transfer of milk that should not be tested, the transferring can be organized so that the amount of transferred milk is maximized, for example by allowing all transfer requests simultaneously.

In still another embodiment of the invention the milking system is provided with a control arrangement for activating and inactivating the operation of the milk constituent analyzing unit depending on an identity of an animal, which is automatically identified in one of the milking stations and the milk of which is transferred in the common milk line. Hereby tests are performed for specific animals, so that animals that need to be tested are tested, but unnecessary testing is avoided.

Preferably, the activation/inactivation may be based on previous results, so that, for example, milk from previously infected animals is tested, or is tested more frequently.

It is also preferred to collect and store physiological data, such as body temperature, hormone levels and activity level, for individual animals and to base the activation/inactivation on the physiological data, such that milk is tested, or is tested with another frequency, from animals depending on the physiological data of the animal.

In this manner, for example, the animal lactation cycles can be foreseen and during sensitive periods the milk can be tested more frequently.

Yet preferably, points of time at which milk was analyzed by the milk constituent analyzing unit are stored, and the activation/inactivation is based on time lapsed since a last analysis was made on milk from an animal whose milk is to be transferred in the common milk line. In this manner the testing frequency for normally behaving and healthy animals during low risk periods can be lowered, and the use of time points is a simple and appropriate manner for controlling and limiting the number of tests made.

The milk constituent analyzing unit is exemplified as a cell counter. Alternatively, or in addition, the milk constituent analyzing unit may be provided for determining the amount or percentage of another constituent such as e.g. a hormone or a protein.

According to another aspect of the invention a method for analyzing milk in a milking system for milking animals is provided. According to the method, milk from a plurality of milking stations is transferred via a common milk line to a milk storage tank, where the milk has been extracted from identified animals in the milking stations. Milk from the common milk line is analyzed with respect to a specific constituent, such as e.g. somatic cells, and the result of the analysis of the milk is associated with the identity of the animal or the identities of the animals, from which the milk was extracted.

BRIEF DESCRIPTION OF THE DRAWINGS

The invention will be described in greater detail below with reference to the accompanying drawings, in which.

DETAILED DESCRIPTION OF EMBODIMENTS

In the following description, for purposes of explanation and in order to provide an understanding of the present invention, exemplifying embodiments are presented. However, it will be apparent to one skilled in the art that the present invention may be practiced in other embodiments that depart from the specific details of these examples. Moreover, detailed descriptions of well-known methods and apparatuses are omitted so as not to obscure the description of the present invention with unnecessary details.

Figure 1:
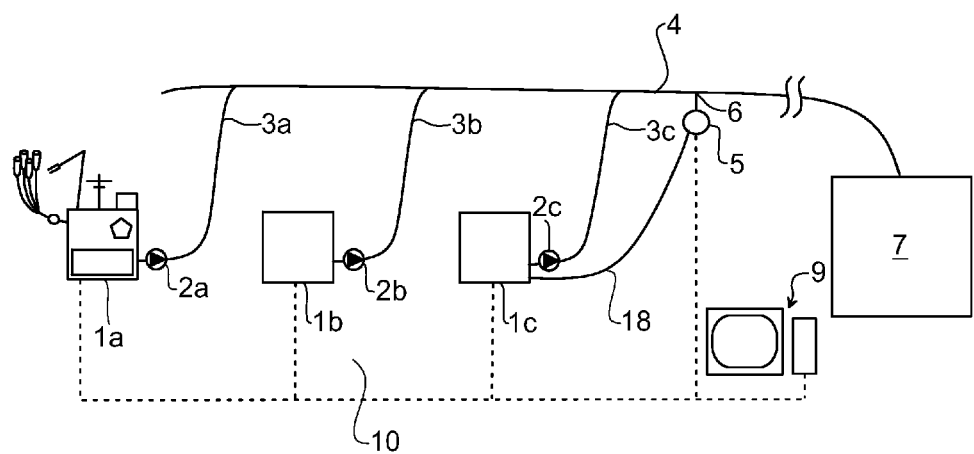
FIG. 1 illustrates a first embodiment of a milking system comprising a plurality of milking stations in accordance with the invention.
Figure 2:
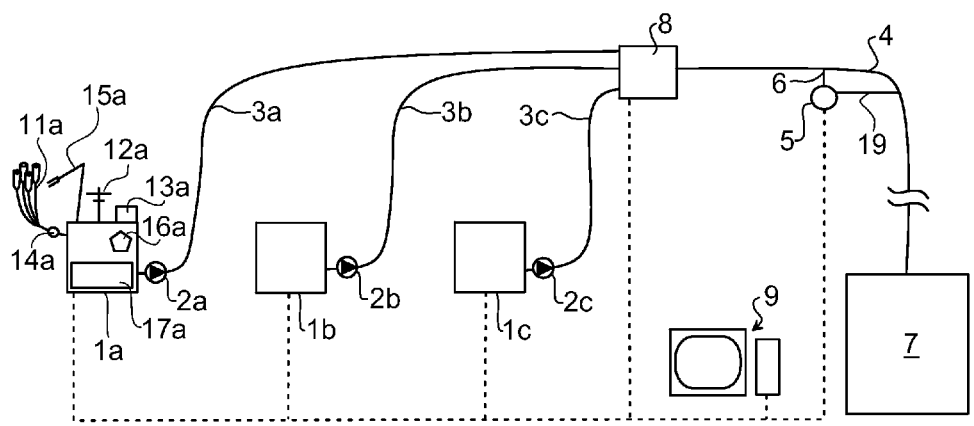
FIG. 2 illustrates a second embodiment of a milking system comprising a plurality of milking stations in accordance with the invention.

FIGS. 1 and 2 illustrates milking systems, each comprising three milking stations 1a-c arranged for milking animals, such as cows, for example on a voluntary basis. The milking stations 1a-c are of the same type and comprise each a milk pump 2a-c connected to a milk storage tank 7 by means of milk lines 3a-c and 4.

FIG. 1 illustrates how each milking station 1a-c is individually connected to the common milk line 4. FIG. illustrates an alternative embodiment where each milking station 1a-c is connected via its individual milk line 3a-c to a common valve arrangement 8, which in turn is connected to the common milk line 4.

Figure 3:
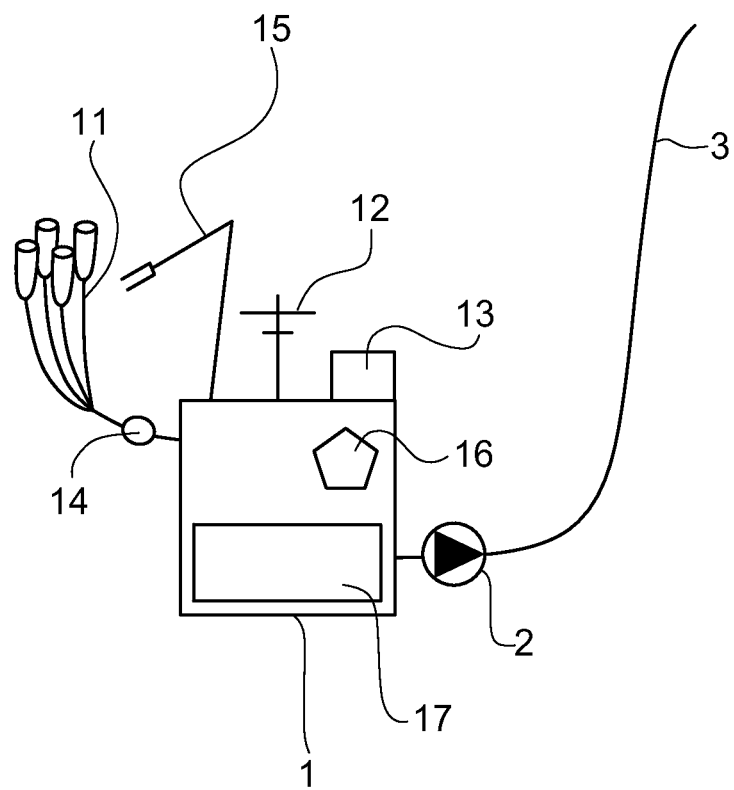
FIG. 3 illustrates one of the milking stations of FIGS. 1 and 2 in greater detail.

One example of a milking station 1 to be used in the invention is illustrated in greater detail in FIG. 3. The milking station 1 includes teat cups 11, a robot arm 15 for automatic attachment of the teat cups 11 to the teats of an animal present in the milking station 1, a milk receiving container 17 to which the teat cups 11 are connected, a vacuum source (not explicitly indicated) connected to the teat cups 11 via the milk receiving container 17 in order to draw milk from the teats of the milk animal during milking, and a milk meter 14 for measuring the milk drawn. Further, the milking station 1 comprises an identification device 13 provided to identify an animal in the milking station 1 and a control device 16 for controlling the milking in the milking station 1.

The control device 16 is communicatively connected to a central control device 9 (FIGS. 1 and 2) e.g. via a data bus. The connection is illustrated as a data connection (a broken line), and can, for example, be provided for by cable or fiber in a computer network, or can be a wireless connection, exemplified by an antenna 12. The central control device 9 handles animal data and comprises typically a microcomputer, software and a database. It can suitably be provided with a user interface, including a display and, for example, a keyboard.

The central control device 9 can alternatively be arranged in one of the milking stations 1a-c and be integrated with the control device 16 thereof. In such manner this milking station can be a "master" milking station having a control device for overall control whereas the other milking stations are "slave" milking stations with control devices 16 for their internal control and with communication with the control device of the "master" milking station for the overall control.

Yet, alternatively, the central control device 9 can be integrated into the milk storage tank 7 and be provided to control various tasks such as e.g. cleaning and cooling of the milk tank 7.

The control device 16 of each milking station 1a-c and the central control device 9 are also communicatively connected to a cell counter 5 (FIGS. 1 and 2), such as an online cell counter (OCC), via the data bus. The cell counter 5 is connected to the milk line 4 referred to as a common milk line 4 since it is common for all the milking stations 1a-c of the milking system via a milk sampling device 6.

The milking systems may comprise further equipment and devices such as e.g. non-return valves, filters, cooling devices, etc., which are not illustrated in the Figures.

During a typical milking operation an animal is identified by the identification device 13 and enters the milking station 1. During milking, milk is drawn from the teats of the animal by means of the vacuum applied to the teat cups 11. The milk drawn is measured by means of the milk meter 14, after which it is collected in the milk receiving container 17.

Alternatively, one milk meter 14 may be provided for each teat cup 11 for measuring the individual milk flow from each teat. Further, each teat cup 11 can be individually connected to a separate compartment of the milk receiving container 17. The measured amount is then stored in the database, using the animal identity, together with a time and date indication.

Thus, each milking station 1a-c collects data obtained during the milking operation and transfers the data to the central control device 9 that stores the data. The central control device 9 can also suitably be adapted to keep a check on if the animal is healthy, should be examined, if its milk should be tested, and/or if the farmer should be notified.

After the milking has been completed the cow may leave the milking station 1. The extracted milk is then pumped, from the milk receiving container 17 to the milk storage tank 7 (FIGS. 1 and 2), by means of the pump 2, via one of the milk lines 3a-c (depending on the milking station used) and the common milk transfer line 4.

The milk sampling device 6 is provided to divert a sample of the milk in the common milk line 4 to the cell counter under control thereof. The milk sampling device 6 comprises an inlet, a valve and a conduit for leading milk from the common milk line 4 to the cell counter 5, and preferably a filter in the flow direction between the common milk line 4 and the cell counter 5 (none of which being illustrated). The milk sampling device 6 can include a, so called, knife outlet for diverting milk from the common milk line 4, it can be arranged to use the force of gravity for leading the milk from common milk line 4, or it can be provided with a pump controlled by the cell counter 5 for pumping milk from the common milk line 4 to the cell counter 5.

Excessive milk being sampled by the milk sampling device 6 can be led back from the cell counter 5 to one of the milking stations 1a-c or to the common milk line 4. For this purpose a tube 19 is arranged between the cell counter 5 and the milking station 1c and the common milk line 4, respectively, as being exemplified in FIGS. 1 and 2, respectively.

There is a risk that sampled milk is affected by remains from a previous milk sample. To prevent this, the first milk of a sample is led back to the milking system via the tube 19 and is not analyzed. In this way the first milk of a sample cleans the system from milk remains from an earlier sample.

According to the invention, the cell counter 5 is arranged to analyze the sampled milk with respect to the cell content, and the result of the analysis of the sampled milk with respect to the cell content, i.e. the cell count, is associated with the identity of the animal or the identities of the animals, from which the sampled milk was extracted. The sampling, analyzing, and associating are preferably performed on a regular basis.

By arranging the milk sampling device 6 in the common milk line 4 it is possible to test milk from any milking station using a single milk sampling device. For this purpose the system is advantageously adapted to control or continuously keep track on the milking stations' pumping of milk through the common milk line 4.

In one version each milking station 1a-c is arranged to inform the central control device 9 when it pumps milk in the common milk line 4 that should be analyzed, and the cell counter 5 with the milk sampling device 6 is arranged to inform the central control device 9 when it samples and tests milk from the common milk line 4, by means of communication, as indicated by broken lines in FIGS. 1 and 2. Alternatively, the cell counter 5 subsequently returns the result of the analysis to the milking station 1a-c in question, which in turn transfers the result of the analysis, the animal identity number and preferably also the amount of extracted milk to the central control device 9 for storing of the data in the database.

Yet alternatively, the valve arrangement 8, in the arrangement illustrated in FIG. 2, can be provided with a control device and communication means for informing the control device 9 from which milking station 1a-c the milk output in the common milk line 4 originate, e.g. which of the individual milk lines 3a-c are connected by the valve arrangement 8 to the common milk line 4.

If milk from two milking stations is transferred simultaneously in the common milk line 4, a sampling of this mixed milk and subsequent testing can, as an example, confirm than none of the animals in question are infected. It can also indicate that both, or at least one of the, animals are infected. A subsequent test next time one of these animals is milked can confirm that the first animal is infected or that the second animal is infected.

If milk from several milking stations is transferred simultaneously in the common milk line 4, a sampling of this mixed milk and subsequent testing can be useful if the milk originates from a group of animals that are grouped together for some reason, i.e. the handling of these animals are not performed on an individual basis but on a group wise basis.

However, the system is preferably adapted to only transfer milk from one animal at a time in the common milk line 4 when the milk is sampled so that milk from several animals is not mixed before being analyzed. The control of the milk transfer is preferably performed by the central control device 9.

To prevent analysis of mixed milk, the milking system can be adapted to allow transfer on a scheduled basis. Such solution can be implemented by assigning milk transfer time periods to the milking stations so that they are allowed to transfer milk in a predetermined time period only. A scheduling system can be implemented by only allowing one station to transfer at any given time, which can be taken care of by the central control device 9.

When providing scheduling of the milk transfer in the embodiment of FIG. 1 the central control device 9 only sends allowance signals to one milking station 1a-c at a time, and when providing scheduling of the system in the embodiment of FIG. 2 the central control device 9 controls the valve arrangement 8 only to connect milk from one station 1a-c at a time to the common milk line 4. In addition to this, the control device 9 can allow simultaneous transfer when it has been determined that none of the milk should be tested.

An alternative to scheduled transfer is to allow the individual milking stations 1a-c to transfer milk in the common milk line 4 on request or demand. In an exemplary on-demand arrangement each milking station 1a-c sends a request to the central control device 9 for allowance to transfer milk when it has milked an animal. The request can suitably be transmitted to the central control device 9 together with information about the identity of the animal that has been milked, i.e. the identity number of the animal, and the extracted amount of milk. The central control device 9 will then allow the milking station to transfer milk only when no other milking station is transferring milk. The central control device 9 can also be adapted to determine, on the basis of data stored about the animal in the database, if the milk is to be tested and if this is the case, request the cell counter 5 to test the milk. If two or more milking stations 1a-c send requests for transferring milk simultaneously, one is instructed to wait, i.e. is not allowed to transfer milk. However, if the central control device 9 determines that milk from neither one of the animals is to be tested, the central control device 9 can allow the milking stations 1a-c to transfer milk in the common milk line 4 simultaneously.

Decisions on whether a milk sample should be taken and a cell count of the sampled milk should be made may be based on a variety of conditions. Thus, the central control device 9 (or the milking stations 1a-c) may be provided for activating and inactivating the operation of the cell counter 5 depending on any of the following:
- the identity of the animal whose milk is being transferred in the common milk line 4
- physiological data for the animal whose milk is being transferred in the common milk line 4
- the time lapsed since the last milk sample was taken from the animal whose milk is being transferred in the common milk line 4

The cell content in the milk stored in the milk storage tank 7 can be predicted based on analyses with respect to the cell counts as performed by the cell counter 5. Such approach is further disclosed in WO 2008/121050, the contents of which being hereby incorporated by reference. If the cell count becomes too high, the central control device 9 may be informed and may take actions in response thereto. In such manner the cell count in the milk stored in the milk storage tank 7 can be regulated.

The cell counter 5 as being described in the present description may be exchanged for any kind of milk constituent analyzing unit for analyzing milk with regard to a specific constituent of the milk, for instance, a hormone, protein, or fat. Hence, the amount of such a specific constituent in the milk stored in the milking tank 7 can be predicted from repeated analyses performed by the milk constituent analyzing unit.

Further, if the milk constituent analyzing unit can be arranged directly in the common milk line to analyze milk therein with regard to a specific constituent of the milk, the milk sampling arrangement may be dispensed with.

Yet further, the invention may be applied to a plurality of different milk constituent analyzing units connected to a milk sampling arrangement for sampling of milk from the common milk line or arranged to analyze milk flowing in the common milk line.

The invention claimed is:

1. A milking system for milking animals, comprising:
   a milk storage tank (7);
   a common milk line (4) connected to the milk storage tank (7);
   at least two milking stations (1a, 1b, 1c) connected to the common milk line (4), each milking station automatically identifying a specific animal, automatically extracting milk from the specifically identified animal, and transferring the milk through the common milk line from the milking station to the milk storage tank;
   a milk constituent analyzing unit (5) connected to the common milk line (4), the milk constituent analyzing unit analyzing the milk provided from each of the plural milking stations through the common milk line (4), with respect to a specific constituent of the milk; and
   a computer (9) operatively connected to the milk constituent analyzing unit (5) and the at least two milking stations, the computer storing milk quality information of the extracted milk and animal identity data of each of the specifically identified animals, the computer controlling the transfer of the milk in the common milk line from each of the at least two milking stations so that the milk from only one of the at least two milking stations at a time is controlled to pass and be analyzed by the milk constituent analyzing unit, and associating a result of the analysis of the milk by the milk constituent analyzing unit from the one milking station from which the milk is transferred with the identity of one or more of the animals specifically identified at the one milking station from which the milk is transferred and analyzed at the milk constituent analyzing unit.

2. The milking system according to claim 1, wherein the milk constituent analyzing unit (5) samples milk from the common milk line (4) and analyzes the sampled milk with respect to the specific constituent.

3. The milking system according to claim 1, wherein the computer allows only one of the milking stations at a time to transfer milk in the common milk line.

4. The milking system according to claim 3, wherein the computer controls each one of the milking stations to transfer milk in the common milk line in response to a request from the one milking station.

5. The milking system according to claim 1, wherein the computer controls the milking stations to transfer milk in the common milk line sequentially on a scheduled basis.

6. The milking system according to claim 1, wherein the computer controls activating or inactivating the operation of the milk constituent analyzing unit depending on the specific identity of the animal, which is automatically identified in one of the milking stations.

7. The milking system according to claim 6, wherein the computer activates or inactivates the operation depending on a previous result of an analysis of milk from said animal, which is automatically identified in one of the milking stations.

8. The milking system according to claim 7, further comprising a database storing physiological data for each of the animals,
   wherein the computer activates or inactivates the operation depending on the stored physiological data for said animal, which is automatically identified in one of the milking stations.

9. The milking system according to claim 7, wherein said milk constituent analyzing unit repeatedly analyzes the milk from the common milk line with respect to the specific constituent.

10. The milking system according to claim 9, further comprising a database configured to store points of time at which each of the milk was taken by the milk constituent analyzing unit,
    wherein the computer activates or inactivates the operation depending on a time elapsed from when milk from said animal, which is automatically identified in one of the milking stations, was last analyzed.

11. The milking system according to claim 1, wherein the milk constituent analyzing unit is a cell counter.

12. The milking system according to claim 1, wherein the computer (9) is provided at, and incorporated into, one of the milking stations (1a, 1b, 1c).

13. A method for analyzing milk, the method comprising:
operating a milking system for milking animals, the milking system including a milk storage tank (7), a common milk line (4) connected to the milk storage tank (7), at least two milking stations (1a-c) connected to the common milk line (4), a milk constituent analyzing unit (5) connected to the common milk line (4), and a computer (9) operatively connected to the milk constituent analyzing unit (5) and the at least two milking stations;
transferring milk from each one of the at least two milking stations (1a-c) via the common milk line (4) to the milk storage tank (7), said milk having been automatically extracted from one or more animals specifically automatically identified in each of the milking stations;
controlling the transfer of the milk in the common milk line from each of the at least two milking stations so the milk from only one of the at least two milking stations at a time is controlled to pass and be analyzed by the milk constituent analyzing unit;
analyzing the milk, by the milk constituent analyzing unit (5), provided from the one of the milking stations (1a, 1b, 1c) through the common milk line (4), with respect to a specific constituent of the milk during the transfer of the milk from the one milking station; and
associating, by the computer (9), a result of the analysis of the milk by the milk constituent analyzing unit from the one milking station from which the milk is transferred with the identity of one or more of the animals specifically identified at the one milking station from which the milk is extracted, transferred, and analyzed at the milk constituent analyzing unit.

14. The method according to claim 13, further comprising selectively activating and inactivating, by the computer, the analysis of milk from at least one of the milking stations depending on the specific identity of the animal, which is automatically identified in the at least one milking station.

15. The method according to claim 13, further comprising sampling the milk from the common milk line to the milk constituent analyzing unit (5) prior to being analyzed.

16. The method according to claim 15, wherein, during the sampling, milk from only one of the milking stations is transferred in the common milk line.

17. The method according to claim 15, wherein, during the sampling, milk from only one of the specifically identified animals is transferred in the common milk line.

18. The method according to claim 13, wherein the automatically transferring the milk comprises controlling the milking stations to transfer the milk in the common milk line sequentially on a scheduled basis.

19. The method according to claim 13, wherein each one of the milking stations is controlled to transfer milk in the common milk line in response to a request from the one milking station.

20. A milking system for milking animals, comprising:
a milk storage tank (7);
a common milk line (4) connected to the milk storage tank (7);
at least two milking stations (1a, 1b, 1c) connected to the common milk line (4), each milking station automatically identifying a specific animal, automatically extracting milk from the specifically identified animal, and to transferring the milk through the common milk line from the milking station to the milk storage tank;
a milk constituent analyzing unit (5) connected to the common milk line (4), the milk constituent analyzing unit analyzing the milk provided from each of the plural milking stations through the common milk line (4), with respect to a specific constituent of the milk; and
a computer (9) operatively connected to the milk constituent analyzing unit (5) and the at least two milking stations, the computer storing milk quality information of the extracted milk and animal identity data of each of the specifically identified animals, the computer controlling the transfer of the milk in the common milk line from each of the at least two milking stations so that the milk from only one of the at least two milking stations at a time is controlled to pass and be analyzed by the milk constituent analyzing unit, and associating a result of the analysis of the milk by the milk constituent analyzing unit from the one milking station from which the milk is transferred with the identity of one or more of the animals specifically identified at the one milking station from which the milk is transferred and analyzed at the milk constituent analyzing unit, the computer controlling activating and inactivating the operation of the milk constituent analyzing unit (5) depending on the specific identity of each of the specifically identified animals, the specific identity being automatically identified in one of the milking stations.

* * * * *